A. J. LEWIS.
AUTOMOBILE SIGNAL.
APPLICATION FILED JULY 9, 1917.

1,274,289.

Patented July 30, 1918.
2 SHEETS—SHEET 1.

INVENTOR
Antone J. Lewis,

BY Victor J. Evans
ATTORNEY

WITNESS
C. F. Rudolph

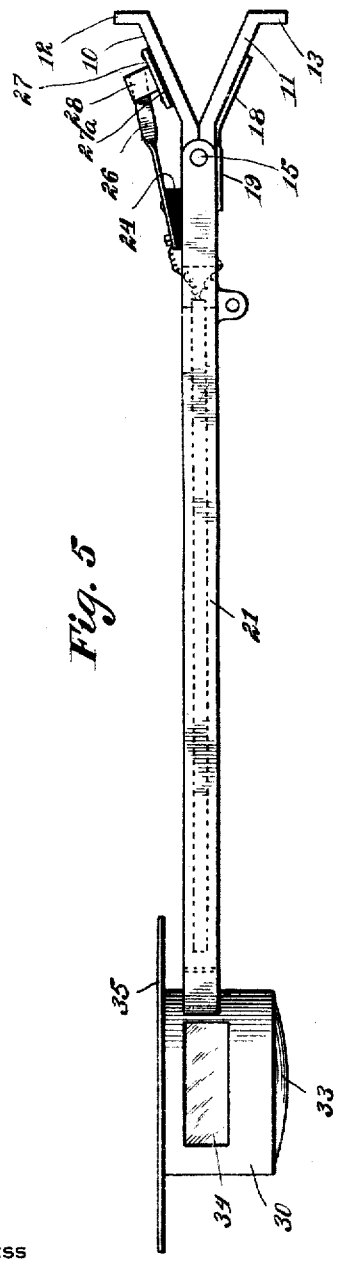
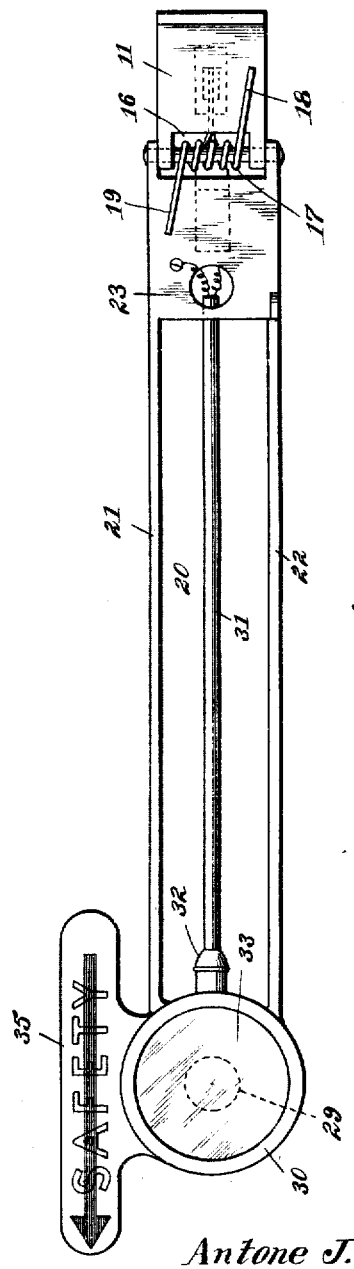

UNITED STATES PATENT OFFICE.

ANTONE J. LEWIS, OF IRVINGTON, CALIFORNIA.

AUTOMOBILE-SIGNAL.

1,274,289.

Specification of Letters Patent.

Patented July 30, 1918.

Application filed July 9, 1917. Serial No. 179,448.

*To all whom it may concern:*

Be it known that I, ANTONE J. LEWIS, a citizen of the United States, residing at Irvington, in the county of Alameda and State of California, have invented new and useful Improvements in Automobile-Signals, of which the following is a specification.

This invention is a signal more particularly adapted for use upon self-propelled vehicles, wherein the traffic indications may be given by the driver to a following vehicle.

One object of the invention is to provide a signal that may be quickly and easily operated by the driver to give an effective warning.

Another object is to provide a signal that will consist of few parts, light and strong in construction, and one that will be cheap and easily installed upon a vehicle.

A further object is to provide a signal, having a swinging arm carrying a light emitting element at its free end and suitable circuit closing means operated by the movement of the arm.

Broadly stated, the invention comprises a swinging arm carrying at its free end a lamp housing on which may be mounted a sign, a lamp within said housing, a circuit for said lamp, and means operated by the swinging of the arm to close the circuit for the lamp, means to return the swinging arm to an inoperative position, means to permit said arm to move to a signal position, said means including a spring, a manually operated element to retract or withdraw said swinging arm from its operative position, and means to attach the arm for swinging movement to the body of a vehicle adjacent the forward end.

One practical form of construction will be described and illustrated in the accompanying drawings, in which:—

Fig. 4 is a detail view of the signal arm; and

Fig. 5 is a top plan view of the arm in an operating position.

Figure 1:
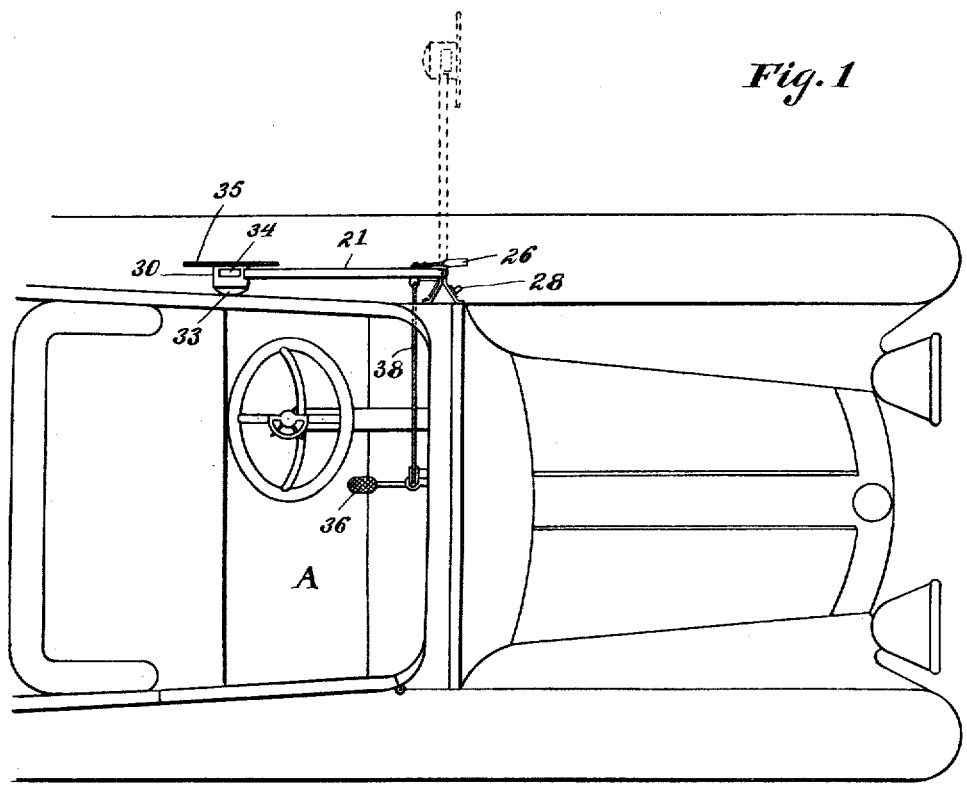
Figure 1 is a detail view showing the device applied to a self-propelled vehicle.
Figure 2:
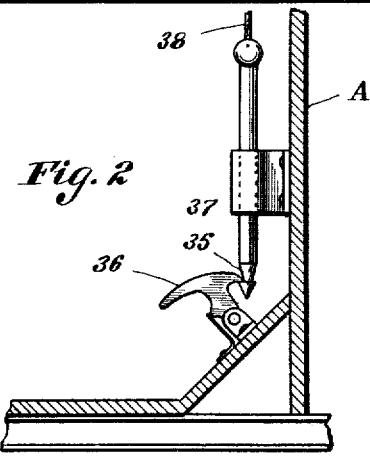
Fig. 2 is a view showing the signal drawn in an opposite direction.
Figure 3:
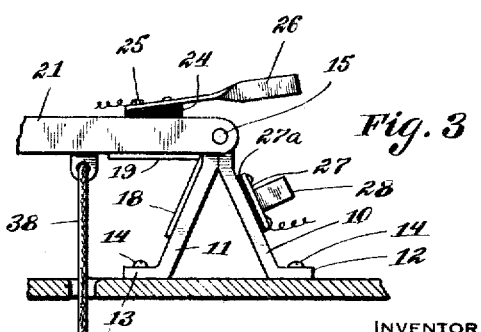
Fig. 3 is a detail view of the switching mechanism.

As shown, the body of the automobile is indicated at A, and connected thereto is a V-shaped element having the sides 10, and 11 that terminate in flanges 12 and 13. These flanges are provided with suitable arms through which may pass any securing means, one of which is indicated by the screws 14. At the apex formed by the juncture of the sides 10 and 11 with each other, there is provided a pivotal connection, the pintle of which may be secured to the sides in any convenient manner, or it may be adapted to rotate in suitable bearings formed at the apex. As shown, this pintle extends the full width of the sides 10 and 11.

Each of the sides 10 and 11 are provided with a recess 16 which permits the uncovering of the central portion of the pintle and also affords a place in which to dispose the spring indicated at 17. The spring 17 is shown as encircling the pintle 15, and is, therefore, of the helical variety having two free ends indicated at 18 and 19. One of the free ends, such as is indicated at 18, lies against the side 11.

As shown, the pintle 15 is of greater width than either of the sides 10 or 11. This is done to provide a hinged connection with the arm indicated at 20. The arm 20 is provided on its upper and lower edges with reinforcing strips indicated at 21 and 22, which extend outwardly from the arm and are provided with suitable holes through which pass the extended ends of the pintle 15, thus providing a hinged connection for the arm. Adjacent this hinged end of the arm, a suitable spacing member, indicated at 23, is employed, which has mounted thereon one portion of a circuit closing device.

As shown this circuit closing device comprises an insulating base 25 to which is secured the switch blade 26. The securing means may be of any usual or customary type. To maintain the base 24 on the arm spacing means 23 the bolts 25 may be employed.

Suitably mounted upon the side 10 of the V-shaped member is a contact member having a base 27 spaced therefrom by the insulation 27ª and projecting spring fingers indicated at 28 for engagement with the switch blade 26. If desired, instead of being single circuit closing means, this may be made as a double point switch. The switching mechanism is provided with terminals to form suitable connections with a lamp indicated at 29, carrying the lamp housing 30. The circuit wires connecting the socket for the lamp 29 with the terminals of the switching mechanism may be carried in a suitable conduit indicated at 31.

In order to provide a removable and detachable connection for the circuit so that the lamp 29 may be turned off, the usual type of Edi-Swann plug and socket may be used, as indicated at 32. The lamp housing 30 may be of the usual type formed of metal, and it is preferred to have the glass front indicated at 33 colored so that the rays emitted will be red. The top of the housing is provided with an oblong opening indicated at 34 in which a clear glass may be inserted which will direct rays of light to the sign indicated at 35.

The sign may bear upon it the word "Safety" and have an arrow extending from and connecting with several letters of the word in order to make it visible at a distance when in operative connection with the colored light thrown out by the lamp housing through its glass front 33. Positioning this sign upon top of the lamp permits a simultaneous operation of a direction signal and also calls the attention of the driver of a following vehicle that some change in direction is contemplated by the leading vehicle.

The arm 20 is maintained in an inoperative position by means of a latch 35 that is operatively connected to a pedal 36 by the connection indicated at 37. When it is desired to permit the arm to move to its signaling position, the pedal may be operated, which by means of its connection 37, moves the latch 35, releasing the arm 20. The spring indicated at 17 has one end bearing against the side 11, while its other free end 19 bears against the spacing member 23. When the arm 20 is maintained in inoperative position energy is stored in the spring 17, so that when the latch is released the spring serves to move the arm 20 to an operative or signaling position.

In order to retract or withdraw the arm 20 from its signaling position to inoperative position, a cable or other suitable element 38 may be employed. The cables should be attached at some convenient point on the arm so that the arm may be swung to its inoperative position with little labor and quickly.

Minor changes in the form, proportions, and details of construction may be resorted to without departing from the spirit of the invention or the scope of the appended claims.

What is claimed as new is:—

1. The combination with a spring actuated signal arm, of a slidably mounted element, a pedal located in the path of movement of said element, means carried by the latter for detachable engagement with the pedal and means connecting the slidably mounted element with the signal arm, whereby the former will hold the latter against movement.

2. The combination with a spring actuated signal arm, of a slidably mounted element, a pedal located in the path of movement of said element, means carried by the latter for detachable engagement with the pedal and an annular shoulder formed on the slidably mounted element for engagement with the pedal, whereby the signal arm will be held against movement.

3. The combination with a spring actuated signal arm, of a slidably mounted bolt, a flexible element connecting said bolt with the signal arm, a spring actuated pedal mounted in the path of movement of the bolt and an annular shoulder formed on said bolt for engagement with said pedal, whereby the latter will hold the signal arm against movement.

In testimony whereof I affix my signature.

ANTONE J. LEWIS.